Sept. 6, 1932.   I. COWLES   1,875,706
FORCE FEED LUBRICATING SYSTEM
Filed April 30, 1927   2 Sheets-Sheet 2
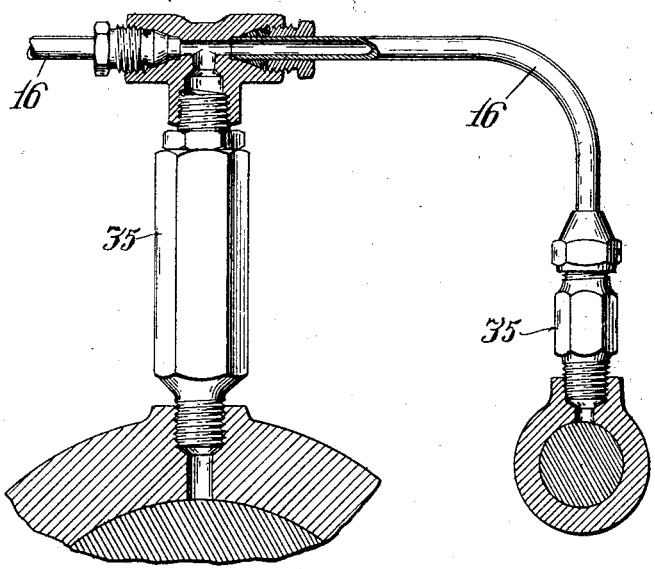
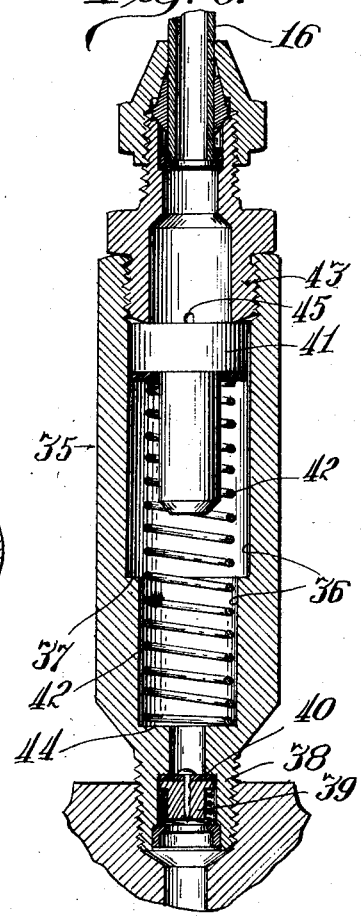
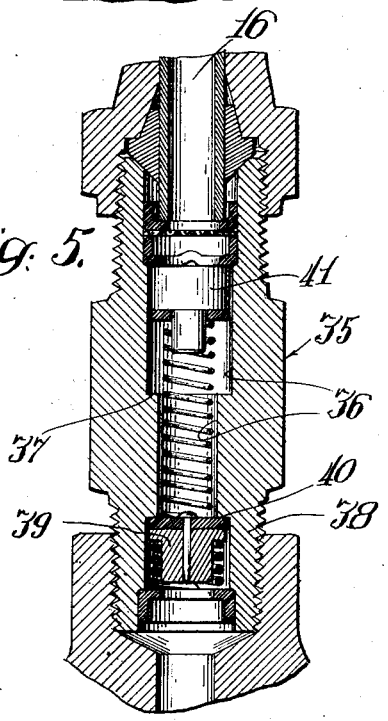
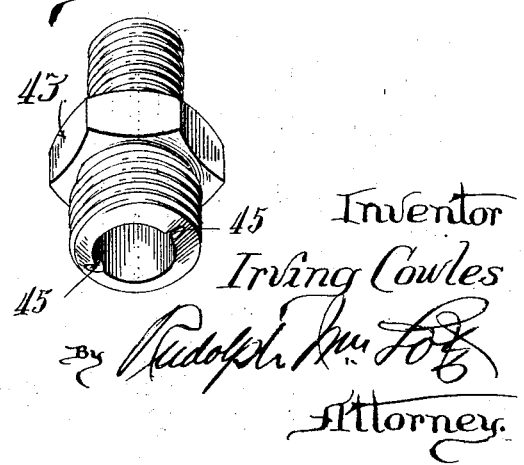
Inventor
Irving Cowles Patented Sept. 6, 1932

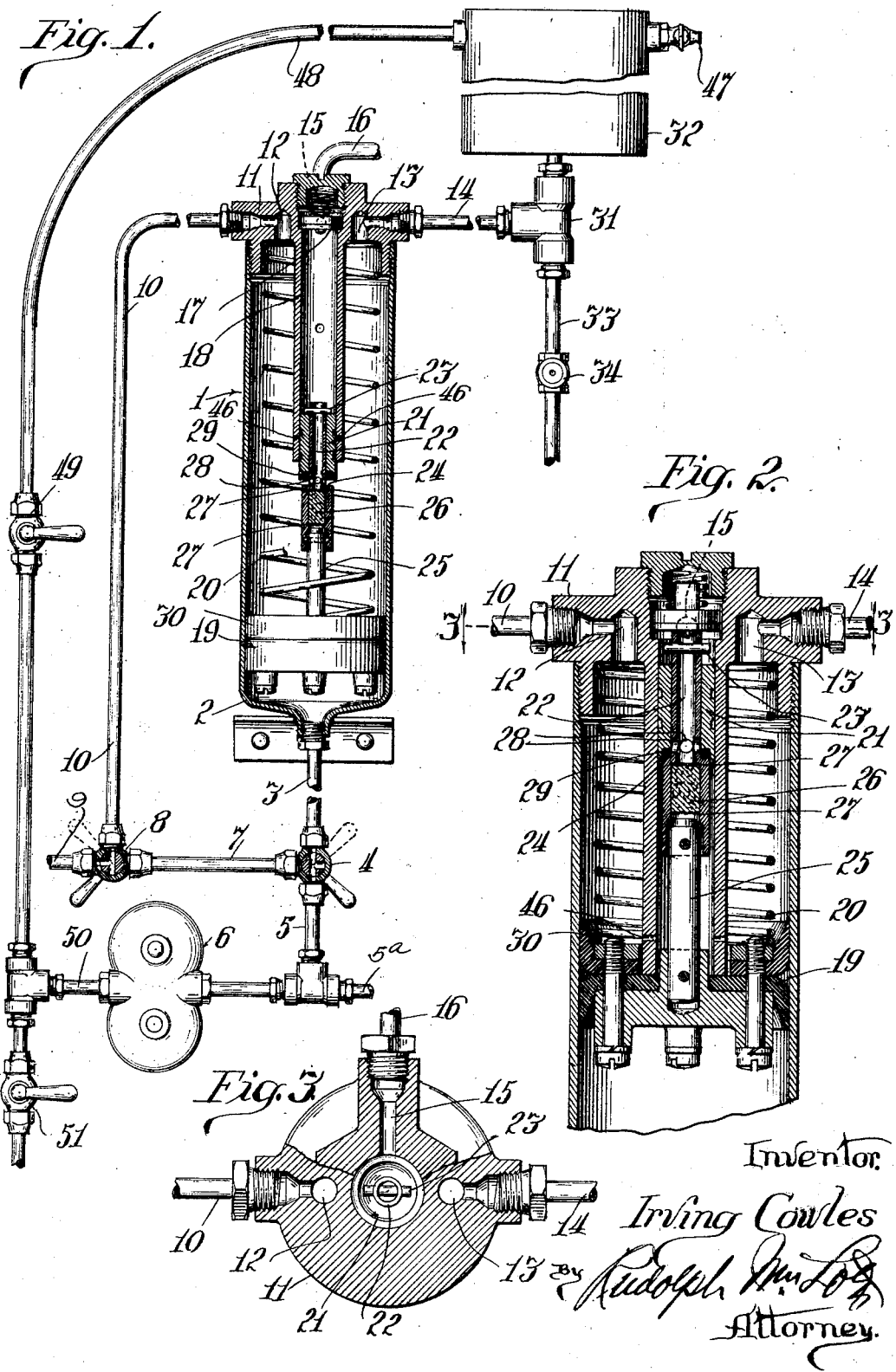

1,875,706

UNITED STATES PATENT OFFICE

IRVING COWLES, OF CHICAGO, ILLINOIS, ASSIGNOR TO UNION BANK OF CHICAGO, OF CHICAGO, ILLINOIS, A CORPORATION OF ILLINOIS, TRUSTEE

FORCE-FEED LUBRICATING SYSTEM

Application filed April 30, 1927. Serial No. 187,741.

This invention has for its object to provide a high-pressure system of lubrication of bearings of machinery and vehicles and includes devices mounted on the bearings for fairly accurately measuring the volume of oil delivered to each thereof, all of said measuring devices being connected with a pump and the latter, in turn, with a source of supply of fluid under pressure for actuating the same.

The main object of the present invention is to provide a lubricating system which is indirectly associated with a source of power such as the motor of an automotive vehicle and is controlled by a suitable hand controlled valve.

In the accompanying drawings illustrating a suitable embodiment of the invention:

Figure 1 is a sectional view showing the preferred type of pump employed and the connections between the same and an engine oil-pump.

Figure 2 is a fragmentary section of the pump showing the operative parts thereof in another position.

Figure 3 is a sectional view on the line 3—3 of Figure 2.

Figure 4 is a fragmentary section showing several bearings equipped with oil measuring devices and piping connecting the same with the pump.

Figures 5 and 6 are sectional views of two distinct types of measuring devices used.

Figure 7 is a perspective of the cap member of a measuring device.

The system includes the pump 1 having at one end a head 2 provided with a central port connected by pipe 3 with the three-way valve 4. In this instance the valve 4 is connected by pipe 5 with the engine oil-pump 6 for receiving oil under pressure from the latter and is also connected by pipe 7 with a three-way valve 8. The latter is connected by pipe 9 with the source from which the pump 6 obtains its oil, and by pipe 10 with the other head 11 of the pump 1.

The head 11 has two always open ports 12 and 13, one of which connects with pipe 10 and the other with a pipe 14. It also has a port 15 which connects with pipe 16 leading to the bearing to be lubricated. The port 15 is controlled by the spring-held check valve 17 and connects with the smaller cylinder 18 concentric with and shorter than pump-cylinder 1. The cylinder 18 is integral with the head 11.

In the pump-cylinder 1 there is mounted the piston 19 which is held by the compression spring 20 normally against the head 2. In the cylinder 18 there is mounted a piston 21 which is slidable on the tubular stem 22 between the cross-pin 23 and the shoulder 24. The stem 22 loosely fits the cylinder 18 at its outer end portion and is connected with the piston 19 by means of the rod 25 which has swivel connection with both the piston 19 and stem 22 in order that any inaccuracy of axial alignment between the bores of cylinders 1 and 18 may be compensated for.

In the larger end portion of the stem 22 is a plug 26 of porous material, such as felt, which is confined between metal screens 27. In the smaller end portion of the stem 22 adjacent the shoulder 24, there are perforations 28 and in the adjacent end of the piston 21 there is mounted a leather washer 29 to seat on the shoulder 24.

The combined length of the stem 22 and connecting rod 25 is such that when the cup-leather 30 of piston 19 seats on the end of cylinder 18, the small end of stem 22 bears upon and holds open the check-valve 17.

Pipe 14 connects with a T-coupling 31 leading to an oil tank 32 and to a pipe 33 equipped with a valve 34. The pipe 33 leads also to the source from which pump 6 receives its supply.

Mounted on each of the bearings to be lubricated is a casing 35 having a stepped cylindrical bore 36 to provide a valve seat 37 between its ends. In the threaded stem 38 of the casing there is mounted a spring-closed check-valve 39 seating on the shoulder 40. Within the larger end portion of the bore 36 there is mounted a piston 41 which is of so much smaller diameter than said bore as to permit of slow leakage of oil past the same. The spring 42 lightly holds piston 41 against the inner end of the cylinder head 43. In Fig. 5 this spring is shown as resting upon the check-valve 39 the spring of which is sufficiently strong to maintain said valve closed against the action of the spring 42 even when the latter is compressed to the point at which the piston 41 seats on shoulder of valve-seat 37. In Fig. 6 the spring 42 is shown as resting upon a shoulder 44 at the end of the smaller portion of the bore 36. Either of these structures may be used but for very small measuring devices the type of Fig. 5 is preferred.

The inner end of the cylinder-head 43 is provided with recesses 45 to prevent the piston 41 from sealing the inlet to the casing 35.

All of the pipes shown are connected to the several other elements by means of compression pipe couplings. The cylinder heads 43 are so constructed at their outer ends as to permit them to be coupled directly with a feed pipe or with a pipe fitting such as an elbow or T-coupling equipped to receive compression pipe couplings as shown in Fig. 4.

The oil fed to the several bearings may be the same as that which is fed to the engine bearings by the pump 6 through pipe 5a or, if desired, may be of a different kind which would be contained in the tank 32.

The pump 6 may, in the event that the oil for the bearings is contained in the tank 32, be considered as constituting merely a source of fluid under pressure such as air, steam, water or oil.

Assuming, however, that the engine oil is to be fed to the bearings with which the casings 35 are associated, the operation is as follows:

Valve 34 is open and valve 8 is positioned as shown in Fig. 1, the pump 6 being in operation, oil under pressure will pass into cylinder 1 and force the piston to the position shown in Fig. 2. All excess oil contained in cylinder 1 will pass out of ports 12 and 13 back to the source.

The initial movement of the stem 22 will cause the shoulder 24 to meet the leather washer 29 and thus the perforations 28 will be closed by the piston 21. Further movement of said stem will effect travel of the piston 21 to force oil in cylinder 18 past the check-valve 17 into the pipe 16 and thence into the several casings 35 of which there will be a number corresponding to the number of bearings to be lubricated. Assuming that the pressure on the piston 19 equals two atmospheres per square inch and the area of said piston to be five square inches, then if the cross-sectional area of the bore of cylinder 18 is one-half a square inch, the pressure developed in said cylinder 18 will be, theoretically, twenty atmospheres per square inch. Thus oil will be discharged from cylinder 18 at high pressure and, consequently, high velocity. This pressure expressed in terms of velocity, causes the oil to pass into the casings 35, which are already full of oil, at a speed far in excess of the speed at which it may leak past the pistons 41 and, consequently, as soon as the pressure on the check-valves 39 attains the pressure (for example, one atmosphere) necessary to open the same, the oil below pistons 41 plus some leakage, will pass into the bearings until the pistons are seated on the seats 37 and thus shut off flow to the bearings.

The capacity of the cylinder 18 must be in excess of the aggregate of all of the casings 35 so that all pistons 41 will be seated before the piston 21 has attained the end of its pressure stroke. After the pistons 41 are seated, the piston 21 will continue its pressure stroke because the excess oil in cylinder 18 will be gradually forced through the plug 26 past the swivel connection between stem 22 and rod 25 into the portion of the cylinder 18 back of piston 21 whence it flows through the perforations 46 into the low pressure end portion of cylinder 1. The density of the plug 26 is such that during the pressure stroke of piston 21 a very high pressure will be maintained due to speed of travel of said piston.

As the pressure stroke of piston 21 is completed, the valve 17 will be held open by the stem 22 to permit gradual relief of pressure in the casings 35 and pipe 16 by seepage through the plug 26 under the influence of such back-pressure as is occasioned by the springs 42 and the springs of the check-valves 39. As soon as this pressure is at or below the assumed one-atmosphere, the pistons 41 will return to their normal positions by leakage of oil past and transference from the upper into the lower end portions of the casings 35, the check-valves 39 preventing back-flow of oil or air from the bearings into said casings.

Upon turning valve 4 to the position shown in dotted lines in Figure 1, the lower end of cylinder 1 will be cut off from the pump 6 and connected with pipe 7 and thus with the upper end of cylinder 1 the valve 8 being also turned to its dotted line position to thus connect the upper end of cylinder 1 with pipe 7. The spring 20 will now force piston 19 back to the position shown in Figure 1 thereby transferring the oil fed from the pump 6 into the low pressure end of cylinder 1. The initial return stroke of stem 22 will be relatively to the piston 21 which will now uncover the perforations 28 to thus permit free flow of oil from the low pressure end of cylinder 18, this initial movement of stem 22 also permitting check-valve 17 to close. Thus during return stroke of stem 22 and piston 21 the cylinder 18 will refill with oil.

If oil of a different kind than that fed to the engine bearings should be desired for the bearings or if the piston 19 is to be actuated by steam, air or water, then the tank 32 would be filled with the desired oil, the valve 34 closed and valve 8 positioned to connect pipe 7 with pipe 9, the latter then leading to atmosphere or wherever desired. In all other respects the operation would be as above described, the tank 32 now constituting the source of oil.

Obviously, by disconnecting pipe 3 from cylinder head 2, and passing a rod through the opening in head 2, the piston 19 may be manually operated.

It will be understood, of course, that the member 6 may be any device capable of generating fluid pressure and thus constitute the equivalent of a pump of the type best suited to the purpose of the invention.

The tank 32 may be of the sealed type provided with an air vent controlled by a valve 47. A pipe 48 equipped with a valve 49 may connect the tank 32 above the oil level therein with the suction pipe 50 of the pump 6 and said suction pipe equipped with a valve 51 for disassociating it from a source of fluid other than tank 32.

If now pipe 3 is omitted, valves 34, 47 and 51 closed and valve 8 turned to disassociate pipe 10 from cylinder 1, and valve 49 opened, the pump 6 will create a partial vacuum in the tank 32 which will be communicated to cylinder 1 above the piston 19 and serve, by entry of atmospheric pressure below the piston 19, to move the latter against the action of spring 20, atmosphere being, in this mode of operation, the source of fluid under pressure for operating the system. Opening valve 47 will relieve the vacuum and permit spring return of piston 19 to normal position.

The cylinder 18 and parts associated therewith constitute a pump, while cylinder 1 and piston 19 with associated parts constitute fluid pressure responsive means for actuating this pump.

It will be obvious, of course, that only such of the piping and valves shown and described will be used as may be required for the specific mode of operation chosen by the user.

I claim as my invention:

1. In a lubricating system, a cylinder adapted to be maintained full of oil, a piston therein, a second pump cylinder communicating at its intake end with the first cylinder, a hollow piston rod for said second pump connected with said piston for actuation by the latter, intake ports between the ends of said piston rod, a piston having limited slidable movement on said rod for controlling said ports, and means for actuating said first-named piston.

2. In a lubricating system, a cylinder adapted to be maintained full of oil, a piston therein, a second pump cylinder communicating at its intake end with the first cylinder, a hollow piston rod for said second pump connected with said piston for actuation by the latter, intake ports between the ends of said piston rod, a piston having limited slidable movement on said rod for controlling said ports, and means for actuating said first-named piston, a source of fluid under pressure connected with said first cylinder to actuate both said pistons, a check-valve at the discharge end of said second cylinder adapted to be maintained open by said rod as the latter attains the limit of its pressure stroke, a bearing connected with the discharge end of said second cylinder, a fluid pressure responsive valve interposed in said connection for shutting off flow to the bearing before said second piston has attained the limit of its pressure stroke, and means within said rod for permitting slow seepage of oil from said second into said first cylinder for permitting completion of said pressure stroke and effecting relief of pressure upon said valve while said check-valve is maintained open.

3. In a lubricating system, a pump for supplying oil under pressure to a bearing, pipe connection between said pump and bearing including a device for limiting flow to the bearing of a volume of oil less than the pump capacity, means for yieldably effecting a pressure discharge operation of said pump, means associated with the latter for permitting completion of its pressure actuation while maintaining a relative constant pressure therein, a springheld check-valve controlling the discharge port of said pump, and means in the latter for maintaining said check-valve open as the pressure actuation of the pump is completed to thereby permit relief of pressure in the pipe connection before the suction stroke of the pump begins.

4. In a lubricating system, a pump having spring actuated means for effecting suction actuation thereof, means for yieldably imparting pressure actuation thereof against the action of said spring, a springheld check-valve controlling the discharge port of said pump, pipe connection between the latter and a bearing, a springheld fluid pressure responsive valve interposed in said connection for shutting off flow to the bearing before the pressure actuation of said pump is completed, and means for permitting a seepage from said pump otherwise than to the bearing during the remainder of its pressure actuation and after completion thereof to thereby effect relief of pipe pressure.

5. The combination with a pump capable of being actuated to discharge liquid therefrom at various pressures and fluid pressure responsive self restoring fluid measuring devices associated with points to be lubricated and with said pump for shutting off flow from the latter to said points upon delivery to each of the latter of a predetermined volume of lubricant, of a mass of permeable material associated with said pump and said devices for discharge of lubricant in excess of the aggregate requirements of said devices after shut off of flow to the points aforesaid at whatever pressure the lubricant may be under following completion of the pressure stroke of the pump.

6. A lubricating system including spring-held fluid pressure responsive devices associated with the bearings adapted, under normal bearing conditions, to shut off flow to the latter after delivery of a predetermined volume thereto, a pump yieldingly actuated to effect delivery of lubricant under pressure to said devices and adapted to deliver lubricant in excess of the normal requirements of said bearings, and a permanently permeable mass of material located for the resisted discharge of excess lubricant from said pump and devices otherwise than to the charged bearings for relieving pressure and permitting the self-restoring of said devices following completion of the pressure stroke of the pump.

7. In a lubricating system of the character defined, a lubricant reservoir, a pump cylinder in one end thereof having a discharge port at the one end of the reservoir and communicating at its other end with the latter between the ends thereof, a tubular plunger reciprocable in said cylinder and provided between its ends with openings, a piston slidable on said plunger and constituting a valve for automatically covering said openings on the pressure stroke to prevent back-flow of oil from the pressure chamber of the cylinder, and uncovering the same on the suction stroke of said plunger to admit oil from the reservoir into the pressure chamber of the cylinder, and a filter plug in said plunger back of said openings for permitting seepage of oil from the pressure chamber to the reservoir during the pressure stroke of the plunger and following completion of said stroke to thereby relieve pressure.

8. A force feed lubricating system including a cylinder constituting a reservoir for lubricant, a spring held fluid pressure responsive member therein, a second pump cylinder of smaller diameter disposed axially of and within the first named cylinder and communicating at its intake end with the latter, a plunger for said smaller cylinder associated with said member for actuation by the latter, a check-valve controlling the discharge port of the smaller cylinder disposed in the path of and adapted to be opened and so maintained as said plunger reaches and remains at the end of its discharge stroke, a valve carried by said plunger controlling the intake to said smaller cylinder, a pressure relief element disposed to permit leakage from the pressure end portion of the cylinder and paths fed thereby while said check-valve is open to permit relief of pressure before the plunger begins its suction stroke, and means for connecting the first-named cylinder with a source of fluid under pressure for actuating the said member against the action of its spring.

9. In a lubricating system, a pump, fluid pressure self responsive restoring devices at the bearings for interrupting flow to the latter after each thereof has received a given charge of lubricant, piping connecting the discharge end of the pump with said devices, a spring closed check-valve in the latter normally preventing back-flow from the piping into the pump, a plunger in the pump adapted to engage and hold open the check-valve at the end of the pressure stroke of said plunger, and means back of the check-valve permitting leakage of fluid from the pump and piping while the check-valve is open to thereby permit self-restoring of said devices without effecting a reverse stroke of said plunger.

10. In a force feed lubricating system for automotive vehicles including a normally operating source of fluid under pressure, a cylinder connected with said source, a self-restoring piston in said cylinder adapted to be actuated by the fluid under pressure, a return line from the latter to said source, a manually operable three-way valve controlling said connection and said line for effecting reciprocation of said piston, a second cylinder of smaller diameter than the first mentioned associated with the latter, a source of lubricant connected with said second cylinder, a reciprocable plunger for the latter associated with said piston for reciprocation therewith, fluid pressure responsive, self-restoring devices at the bearings for controlling flow to the latter at each pressure stroke of said plunger, and means permitting leakage of lubricant while the plunger remains at the end of its discharge stroke to thereby permit self-restoring of said devices prior to reverse stroke of said plunger.

11. A force feed lubricating system including a source of lubricant, a reciprocable piston pump associated at its intake end with the same, fluid pressure responsive, self-restoring devices at bearings to be lubricated for controlling flow to said bearings, piping connecting the said devices with the discharge end of said pump, a cylinder, a source of fluid under pressure and an exhaust line for one end of said cylinder, a manually operable three-way valve controlling flow from said source to and the discharge from said end of said cylinder, a spring-held piston in said cylinder connected with the piston of said pump and operable by fluid under pressure to impart a pressure stroke to the said pump piston upon each operation of the three-way valve in one direction, and a by-pass permitting leakage of lubricant during and following the pressure stroke of the pump piston to permit self-restoring of said devices prior to initiating a suction stroke of said piston of said pump.

IRVING COWLES.